United States Patent
Kang et al.

(10) Patent No.: US 6,958,894 B2
(45) Date of Patent: Oct. 25, 2005

(54) RELAYING METHOD FOR PROTECTING A TRANSFORMER USING A DIFFERENCE OF CURRENT

(75) Inventors: Yong Cheol Kang, Ajung Hyundai Apt. 109-1502, 858-2 Inhu I-dong, Deokjin-gu, Chonju-si, Chunbuk 561-231 (KR); Sang Hee Kang, Jugong Apt. 326-205, Banpo 1-dong, Seocho-gu, Seoul 137-061 (KR); Byung Eun Lee, Chonju-si (KR); Jae Sung Yun, Kunsan-si (KR)

(73) Assignees: Yong Cheol Kang, Chonju-si (KR); Sang Hee Kang, Seoul (KR)

( * ) Notice: Subject to any disclaimer, the term of this patent is extended or adjusted under 35 U.S.C. 154(b) by 314 days.

(21) Appl. No.: 10/333,390

(22) PCT Filed: May 17, 2001

(86) PCT No.: PCT/KR01/00810

§ 371 (c)(1),
(2), (4) Date: Jan. 17, 2003

(87) PCT Pub. No.: WO02/093710

PCT Pub. Date: Nov. 21, 2002

(65) Prior Publication Data

US 2004/0004794 A1 Jan. 8, 2004

(51) Int. Cl.⁷ .................................................. H02H 7/04
(52) U.S. Cl. ......................................................... 361/38
(58) Field of Search ............................... 361/35, 36, 38; 340/646; 700/292

(56) References Cited

U.S. PATENT DOCUMENTS

| | | | | | |
|---|---|---|---|---|---|
| 4,661,877 A | * | 4/1987 | Usui | ............................ | 361/36 |
| 4,772,978 A | * | 9/1988 | Oura et al. | .................... | 361/36 |
| 5,014,153 A | * | 5/1991 | Wilkerson | ..................... | 361/36 |
| 5,172,329 A | * | 12/1992 | Rahman et al. | ............. | 700/293 |
| 5,784,233 A | * | 7/1998 | Bastard et al. | ................. | 361/36 |
| 6,356,421 B1 | * | 3/2002 | Guzman-Casillas et al. | .. | 361/36 |
| 6,483,680 B1 | * | 11/2002 | Kulidjian et al. | ............. | 361/36 |

FOREIGN PATENT DOCUMENTS

JP       07193987 A  *  7/1995  ............ H02H/7/04

* cited by examiner

*Primary Examiner*—Brian Sircus
*Assistant Examiner*—Boris Benenson
(74) *Attorney, Agent, or Firm*—Baker & McKenzie LLP

(57) ABSTRACT

Disclosed is a relaying method for protecting a transformer by using a difference of current. A decision function, related to the rate of change of a primary current, a secondary current, or a differential current, is used for determining whether a detected abnormal current is due to the inrush or internal fault.

5 Claims, 5 Drawing Sheets

RELAYING METHOD FOR PROTECTING A TRANSFORMER USING A DIFFERENCE OF CURRENT

TECHNICAL FIELD

The present invention relates to a relaying method for protecting a transformer, and more particularly, to a relaying method for protecting a transformer using a rate of current change, which precisely detects internal faults in the transformer by using the rate of change of current or differential current of a primary coil and/or a secondary coil of the transformer, so as to determine whether an abnormal current is due to an inrush current or an internal fault of the transformer.

BACKGROUND ART

In order to protect a transformer against an internal fault, a differential current type relay system has been utilized in the case of a generator and a power transmission line. The differential current type relay system is a method for deciding the internal faults when the differential current is greater than a predetermined value by obtaining the differential current between both terminals of the transformer. However, the differential current is largely caused by a large electric current through the primary coil, which is called an inrush. In this case a differential current can occurs other than internal faults.

Since the current of the primary coil contains a great amount of harmonic wave components at the inrush phenomenon, a second harmonic suppression differential current method, which uses the differential current as a driving current for driving the relay and a second harmonic component as a suppression current, is utilized in order to distinguish the internal fault and the inrush phenomena. In order to distinguish the internal fault and an over-exciting phenomenon, a fifth harmonic suppression differential current method utilizes a fifth harmonic component. However, since the size of the respective harmonic components can be changed depending on whether magnetic flux is residual or not, or depending on the size of the remanent magnetic flux as well as the second harmonic component can be changed even in an internal fault if the system's condition and material of the core of the transformer are changed, it is difficult to accurately tell the internal fault from the inrush. Moreover, since the method makes its determination in a frequency region in order to obtain the harmonic components, the time to accumulate data during one time period is required and so the rapid determination cannot be achieved.

DISCLOSURE OF THE INVENTION

In order to solve the problem above, it is an object of the present invention to provide a relaying method for protecting a transformer using a rate of current change, which precisely detects internal faults in the transformer by using a rate of change of current of a primary coil or a secondary coil of the transformer, or a rate of change of differential current between the current of the primary coil and the secondary coil of the transformer; so as to determine whether the change of current is due to an inrush current or an internal fault of the transformer.

To achieve the above object, a relaying method for protecting a transformer includes the steps of 1) selecting a decision function based on one of a primary current of the transformer, a secondary current of the transformer, and a differential current between the primary current and the secondary current, 2) determining the value of the decision function by measuring the primary current and/or secondary current of the transformer and determining whether the value of the decision function is greater than a predetermined critical value at every point in time, 3) memorizing a certain point of time as a first detecting time when the value of the decision function is initially determined as a value greater than the critical value at a certain point of time or at a previous secondary detection point of time, 4) determining as an inrush the case that the value of the decision function is detected as a value greater than the critical value at a certain point of time before a predetermined time and after the first detection point of time, and 5) determining as an internal fault the case that the value of the decision function is not detected as a value greater than the critical value at a certain point of time after a predetermined time and the first detection point of time, and generating a signal for driving a circuit breaker to protect the transformer.

According to the feature of the present invention, in step 1), the decision function is one of second derivatives or adjusted second derivatives of the primary current, the secondary current, and the differential current, or one of the energy functions of the second derivatives or the adjusted second derivatives of the primary current, the secondary current, and the differential current.

Moreover, in step 1), the decision function is one of third derivatives or adjusted third derivatives of the primary current, the secondary current, and the differential current, or one of the energy functions of the third derivatives or the adjusted third derivatives of the primary current, the secondary current, and the differential current.

Preferably, in step 1), the decision function is one of fourth derivatives or adjusted fourth derivatives of the primary current, the secondary current, and the differential current, or one of the energy functions of the fourth derivatives or the adjusted fourth derivatives of the primary current, the secondary current, and the differential current.

Moreover, according to the feature of the present invention, step 2) includes the sub-step of preventing a malfunction by, when the values of the decision function greater than the critical value are continuously detected, determining only one specific point of time among the values an effective detecting time and disregarding the other specific points of time.

FIG. 1 shows a relaying system for protecting a transformer of a conventional differential current type. As shown in FIG. 1, the conventional relaying system includes a transformer 40 for connecting both terminals 10 and 70 in a power system, a primary current measuring section 30, a secondary current measuring section 50, and a transformer protecting controlling section 80 for generating a control signal to drive circuit breakers 20 and 60 for protecting the transformer by using the primary and secondary currents measured by the measuring sections 30 and 50.

FIG. 2 shows an equivalent circuit for analyzing the transformer when the inrush occurs. In FIG. 2, a reference character i indicates current, v indicates voltage, $L_m$ indicates a magnetizing inductance, and $L_l$ indicates a leakage inductance of the transformer. The magnetizing inductance $L_m$ represents non-linear characteristics as shown in FIG. 3, which have different values before and after saturation of the transformer. The value of the magnetizing inductance has a relatively large value before the saturation of the transformer, but has a lower value after the saturation.

FIG. 5 shows a differential current, a first derivative diff1 of the differential current, a second derivative diff2 of the differential current, a third derivative diff3 of the differential current, and a trip for driving the circuit breakers according to the preferred embodiment of the present invention when the inrush occurs under 80 percent of the remanent magnetic flux in the transformer.

FIG. 6 shows a differential current, a first derivative diff1 of the differential current, a second derivative diff2 of the differential current, a third derivative diff3 of the differential current, and a trip for driving the circuit breakers generated by a method according to the preferred embodiment of the present invention when a short fault between layers occurs as one of the internal faults.

The inrush indicates a repetitious phenomenon that the magnetic flux exceeds the saturated point in the core and is decreased below the saturated point when the transformer is provided. Thus, the magnitude of the magnetizing inductance of the core is repeatedly changed from a large value below the saturated point to a small value over the saturated point. Moreover, the over-excitation is also a phenomenon that the magnetizing inductance of the core is repeatedly changed when a larger voltage than a rated voltage is applied to the transformer. Therefore, the value of an exciting current is repeatedly changed from a large value to a lower value, just like the highest current characteristic curve in FIG. 5.

However, the internal fault involves the phenomenon where a part of the winding is lost at an instance when the fault occurs, but the internal parameter is not repeatedly changed. Even though the differential current occurs in the above two cases, the differential currents are different from each other. In other words, since the value of the magnetizing inductance is repeatedly changed in the inrush and the over-excitation, the form of the differential current is repeatedly changed on a large scale. On the other hand, in the case of the internal fault, only at the instant when the internal fault occurs will there be a large change to the waveform of the differential current, just like the highest current characteristic curve in FIG. 6. Such a change does not occur after the instant.

The difference between the inrush and the internal fault is clearly represented in the first, second, and third derivatives diff1, diff2, and diff3 of the differential current shown in FIGS. 5 and 6. More particularly to the second and third derivatives diff2 and diff 3 of the differential current, periodic peaks are generated in the case of the inrush, as shown in FIG. 5, and discontinuous points and peaks do not appear again after the initial occurrence of the discontinuous points and peaks as shown in FIG. 6. Based on this observation, the present invention discloses a relaying method for protecting a transformer using a rate of change of electric current. According to the present invention, since the inrush and the internal fault can be distinguished by using data of second or higher derivatives of the differential current, the trip for driving the circuit breakers in order to protect the transformer, as shown in the lowest graph in FIGS. 5 and 6, ascends from a normal state 0 (zero) to a value (0.5 in FIG. 6) of a standby to drive the circuit breakers when a differential current over an initial predetermined critical value occurs (hereinafter referred to as an initial detection or a first detection). If a periodic peak is detected again after a predetermined time has passed (hereinafter referred to as a secondary detection), the inrush is determined and the trip descends to the normal state again as shown in FIG. 5. If the first detection instead of the initial detection is found again after the secondary detection, the above procedure is repeated. On the contrary, in the case of the internal fault, the periodic peak, is not detected after a predetermined time after the first detection as shown in FIG. 6. Therefore, the trip for driving drives the circuit breakers. In other words, the present invention discloses a relaying algorithm for protecting a transformer using the differential current as a driving signal for driving a circuit breaker, and the detection of the periodic peak in the function related to the rate of change of current containing the second derivatives of the primary current, the secondary current, and the differential current as a suppression signal for suppressing the circuit breakers.

BRIEF DESCRIPTION OF THE DRAWINGS

The above object and advantages of the present invention will become more apparent by describing the preferred embodiments thereof in detail with reference to the attached drawings in which.

BEST MODE FOR CARRYING OUT THE INVENTION

Hereinafter, the present invention will be described in detail by describing the preferred embodiments of the invention with reference to the accompanying drawings.

Figure 1:
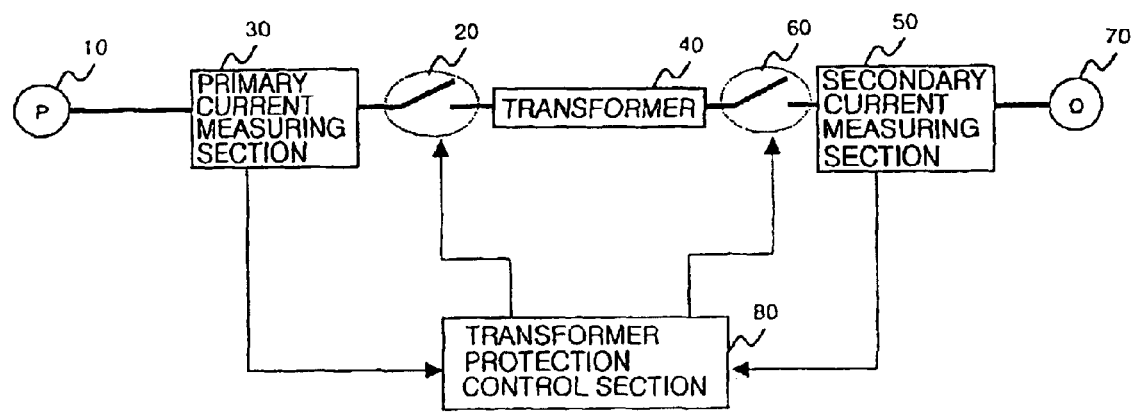
FIG. 1 shows a relaying system for protecting a transformer of a conventional differential current type.
Figure 2:
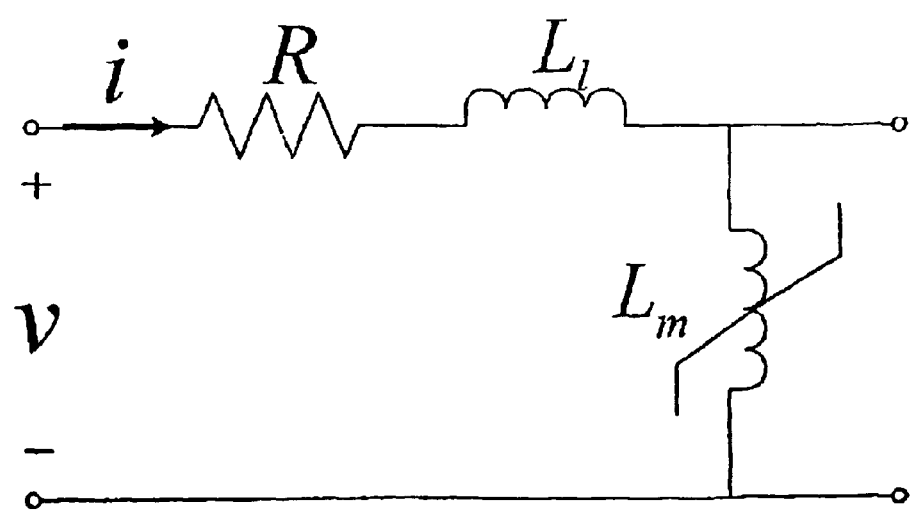
FIG. 2 shows an equivalent circuit for analyzing the transformer when the inrush occurs.
Figure 3:
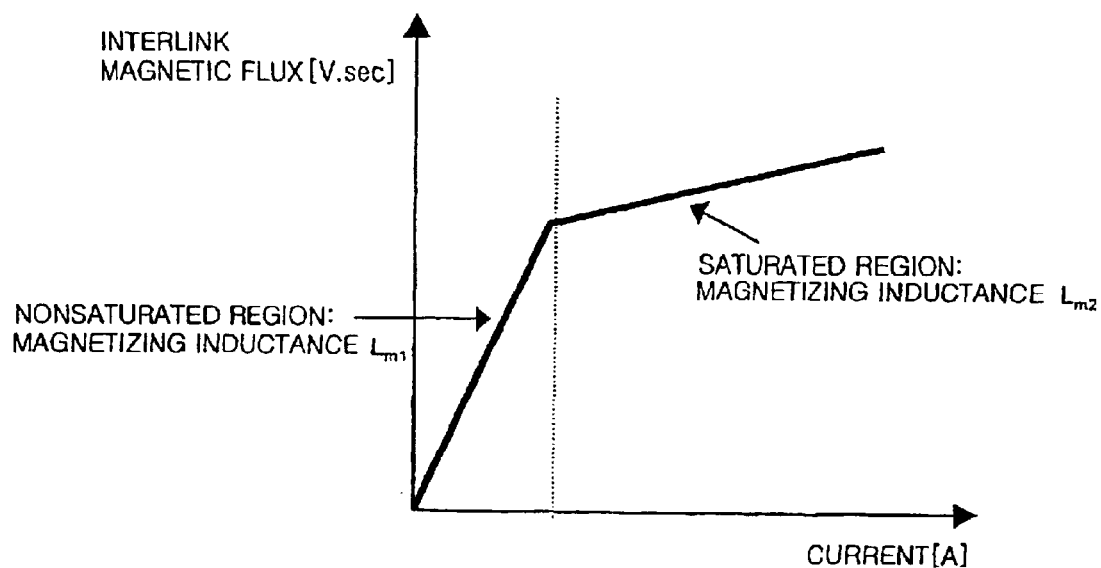
FIG. 3 shows non-linear characteristics of the magnetizing inductance.
Figure 4:
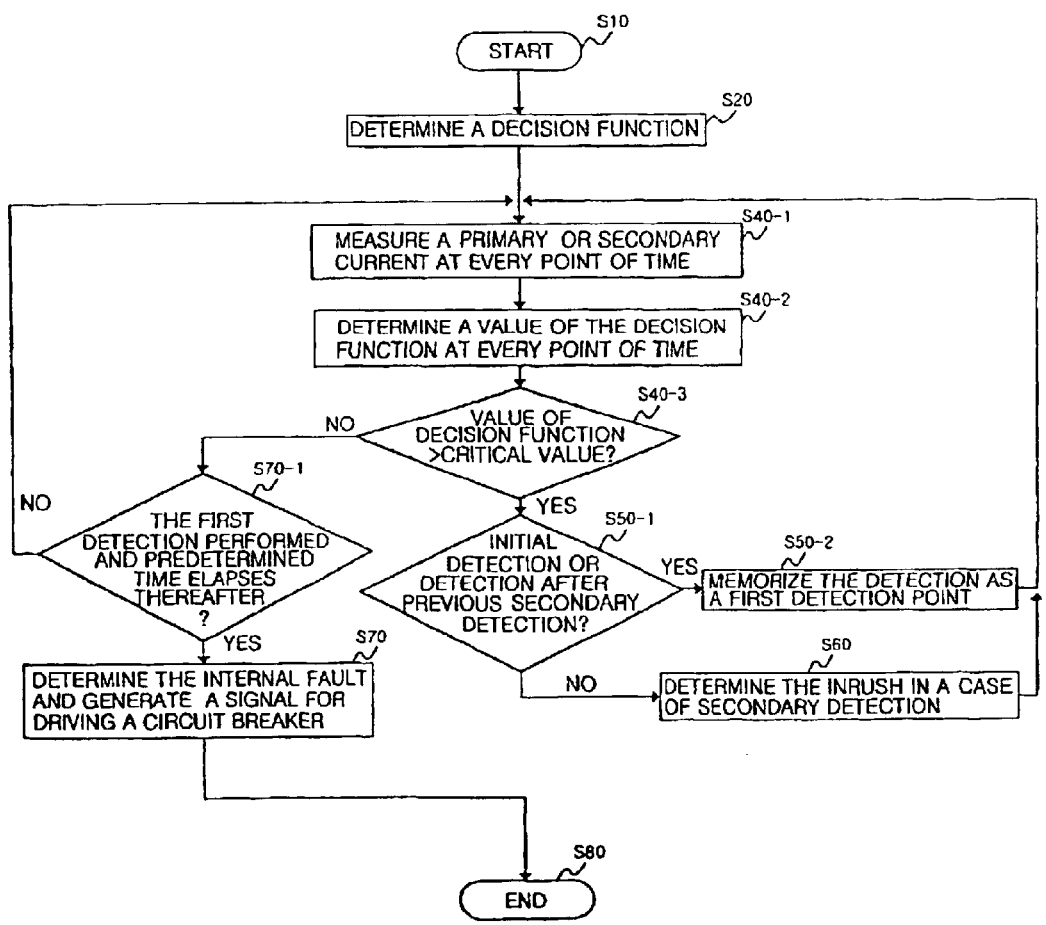
FIG. 4 shows a relaying method for protecting a transformer using a rate of change of electric current according to the preferred embodiment of the present invention.

FIG. 4 shows a relaying method for protecting a transformer using a rate of change of electric current according to the preferred embodiment of the present invention. As shown in FIG. 4, the relaying method for protecting a transformer according to the present invention includes the steps of 1) selecting a decision function (Step S20), 2) determining the value of the decision function (Step S40-2) by measuring a primary current and/or secondary current of a transformer (Step S40-1) and determining whether the value of the decision function is greater than a predetermined critical value at every point in time (Step 40-3), (Step S40), 3) memorizing a certain point of time as a first detecting time (Step S50) when the value of the decision function is initially determined as a value greater than the critical value at the certain point of time or after at a previous secondary detection point of time (Step S50-1), 4) determining a case that the value of the decision function is detected as a value greater than the critical value at a certain point of time before a predetermined time and after the first detection point of time as an inrush (Step S60), and 5) determining a case that the value of the decision function is not detected as a value greater than the critical value at a certain point of time after a predetermined time and the first detection point of time (Step S70-1) as an internal fault, and generating a signal for driving a circuit breaker to protect the transformer (Step S70-2).

In the decision function, functions relating to rate of change with respect to time of the primary current of the transformer and the secondary current of the transformer, or the differential current, which implements the difference between the primary and secondary current of the transformer, are used. This is a remarkable feature of the present invention. Derivative functions of the primary current, the secondary current, or the differential current can be used as these functions. For example, del2[n]=del1[n]−del[n−1] is an example of the differential function, where del1[n]=Di[n]−Di[n−1], Di[n] indicates a value of a discrete differential current, and n indicates an index of the discrete value of data with respect to time. If necessary, the primary current or the secondary current is directly used without using the differential current. A function in proportion to del2[n] or containing del2[n] can be used, and various modifications and changes can be applied. If the modification is limited to arithmetical matter, it is merely a change of design. Calculating del2[n] and representing a function of Di[n] is shown in Equation 1 below.

$$del2[n]=Di[n]-2Di[n-1]+Di[n-2] \quad \text{Equation 1}$$

Therefore, in order to use the second derivative as a decision function, a discrete differential current relating to time as a variable of the right side of the Equation 1 is needed. Moreover, in order to efficiently detect a peak greater than the critical value without using the function as is, it is possible to weigh the respective terms of the equation, that is, to adjust the coefficients of each of the terms. For example, the second derivative can be used as the decision function for maximizing the peak detection effect by adjusting the second derivative through experiment or simulation as follows.

$$del2[n]=a.\text{multidot}.Di[n]-b.\text{multidot}.Di[n-1]+c.\text{multidot}.Di[n-2] \quad \text{Equation 2}$$

The modification as seen above can be easily performed by one skilled in the art of the present invention based on the present invention, and is not beyond the scope of the present invention.

Moreover, since the waveform of the current contains a large amount of noise, an energy function of a derivative function with respect to a certain interval without using the above derivative function as is, in order to enhance the peak detection effect to be greater than the critical value. The energy equation is as follows.

$$1E(n)=1Nk=n+N+1ndel22[n] \quad \text{Equation 3}$$

Moreover, derivative of the primary current, the secondary current or the differential current of the decision function having higher degree coefficients (for example, a third derivative or fourth derivative) can be used. Similar to the second derivative, the adjusted derivative function and the energy function can be applied to the new derivative functions. Since these modifications are obvious to one skilled in the art of the present invention, the detailed description of the modification is omitted.

Since the peak portion is not distinguished from other portions when the peak portion of the second derivative is not so large as other portions, as shown at the waveform of the second derivative diff2 of the drawing, a method for determining the inrush or the internal fault by comparing the second derivative or the adjusted second derivative with the predetermined critical value has the possibility of malfunctioning the determining algorithm. This may influence the stability of operation of the transformer protection system.

Figure 5:
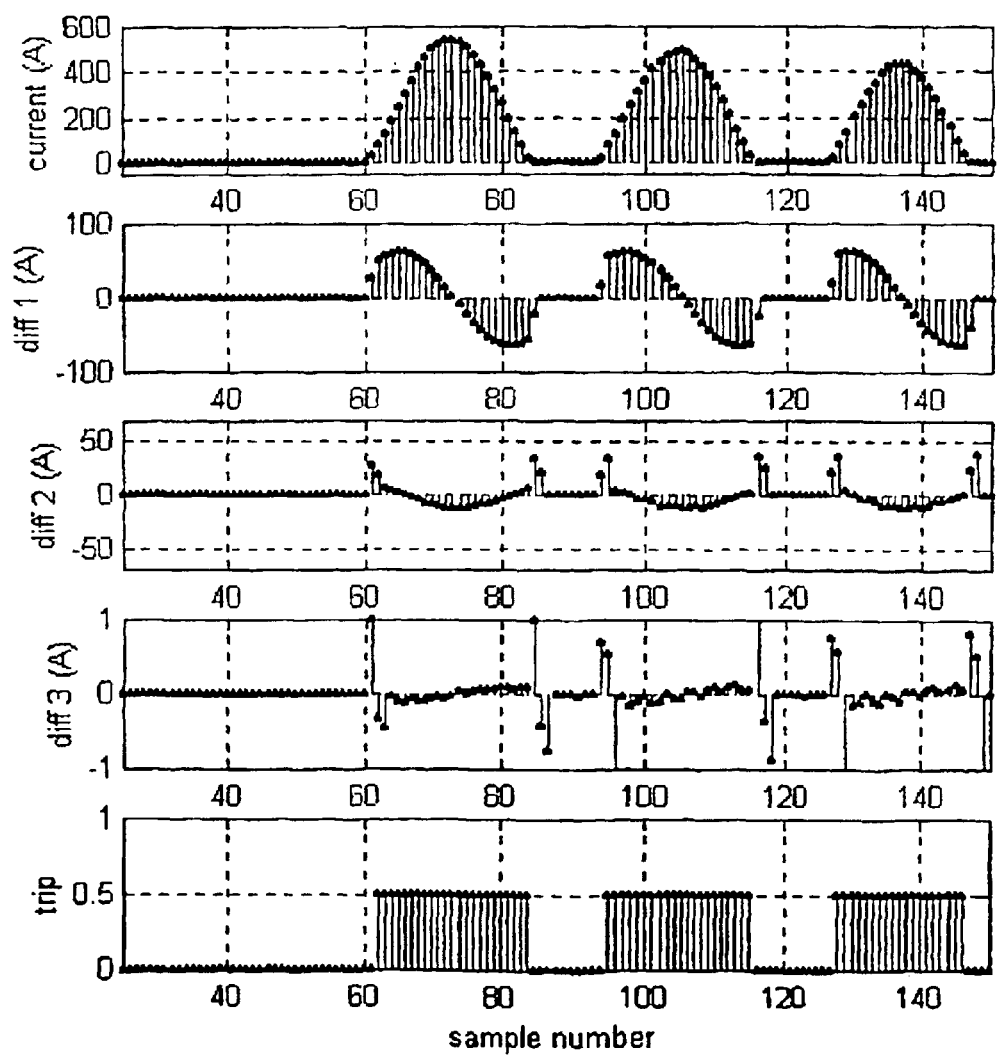
FIG. 5 shows a differential current, a first derivative diff1 of the differential current, a second derivative diff2 of the differential current, a third derivative diff3 of the differential current, and a trip for driving the circuit breakers according to the preferred embodiment of the present invention when the inrush occurs under 80 percent of the remanent magnetic flux in the transformer.
Figure 6:
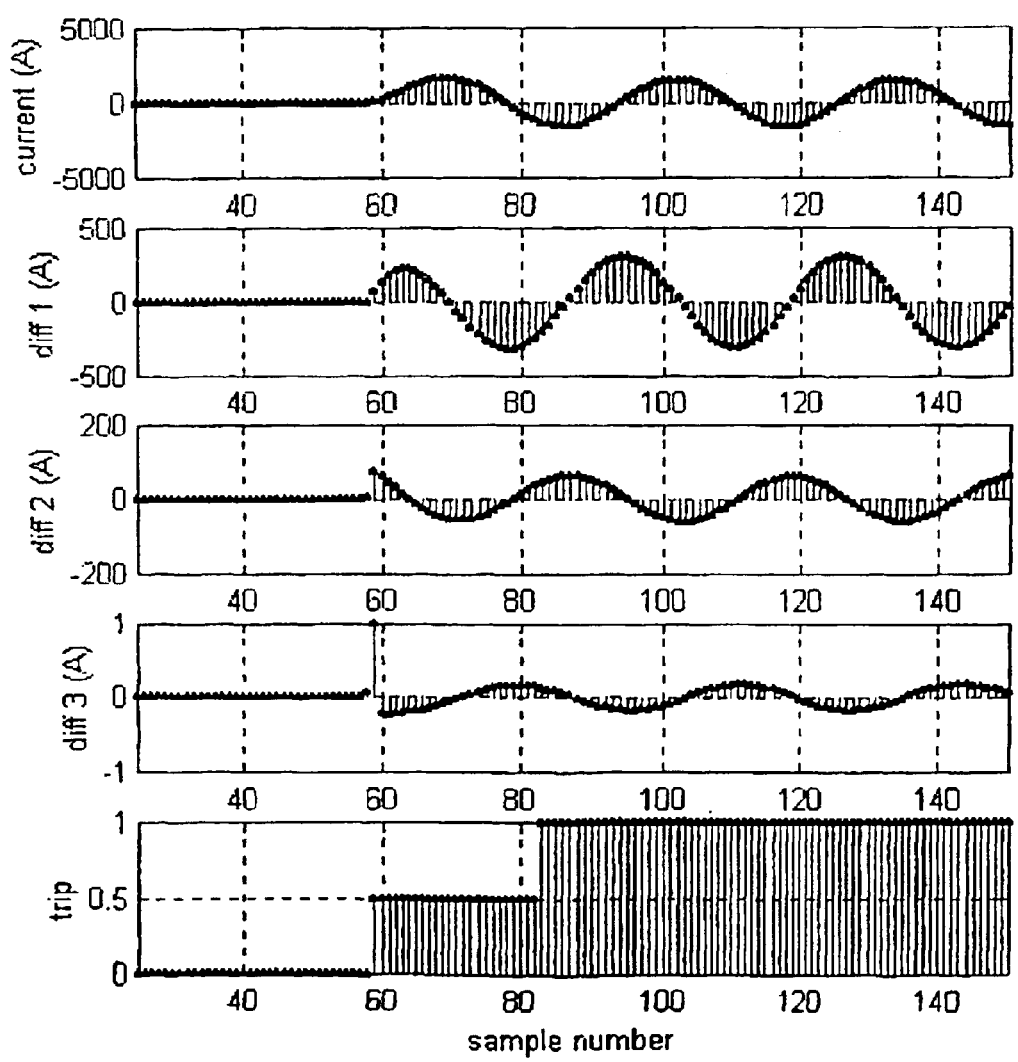
FIG. 6 shows a differential current, a first derivative diff1 of the differential current, a second derivative diff2 of the differential current, a third derivative diff3 of the differential current, and a trip for driving the circuit breakers generated by a method according to the preferred embodiment of the present invention when a short fault between layers occurs as one of the internal faults.

To overcome these problems, it is preferable to use the third derivative (diff3) (del3[n]=del2[n]−del2[n−1]) as a decision function, as shown in FIG. 5. However, the difference between the peak portion and other portions is noticeable, rather than the case when the second derivative is used. The higher the coefficient of the derivative is, the wider the difference between the peak portion and other portions. Thus, the allowable range designating the critical value is wider, so that there is a remarkable effect that the determination is more precise. It is one of the features of the present invention that the higher derivative is used as a decision function rather than the third derivative.

For the same reason as the case of the third derivative, the fourth derivative (del4[n]=del3[n]−del3[n−1]) can be used in order to increase the detection effect of the peak.

According to the preferred embodiment of the present invention, the inrush can be determined without the presence of the remanent magnetic flux, which is contrary to the conventional art. FIG. 5 shows the operation and effect of the preferred embodiment of the present invention in a case of the remanent magnetic flux of 80%. The 80% magnetic flux means that an initial remanent magnetic flux of 80% with respect to the amount of the magnetic flux is used to start the saturation.

The relaying method for protecting a transformer using the rate of change of current according to the present invention is not limited to the described embodiments, and does not stray away from the spirit and the main object of the present invention that is claimed in the appended claims. One skilled in the art can variously modify the present invention. Since, the determination of the inrush can be achieved even if a derivative is used as the decision function having coefficients higher than the second derivative or the third derivative (for example, the fourth or fifth derivative), it is still within the scope of the present invention.

However, there is a substantial need to consider that the derivative or the numeric derivative is used as the decision function at the determining step (Step S40-3) as described above. The numeric derivative and the derivative, according to the characteristics thereof based on the discrete data, have errors with respect to detecting the point of time, as much as time (corresponding to a sampling period on a time axis of data) corresponding to the interval DT of the respective data. Moreover, in the case that the second derivative or the derivative equal and/or higher than the third derivative or the numeric derivative are used as the decision function, the error increases more and more. In order to decrease the error, the interval between the discrete data and the increase of the sampling rate should be narrowed. The solution to this problem is described by reference to FIG. 5 as follows. If the second derivative diff2 or the third derivative diff3 is used as the decision function, values of the discrete decision function, as shown in FIG. 5, are represented as a plurality of continuous peaks. If all three, four, or more peak values are greater than the critical value, the first detection and the second detection can be determined at the continuous peaks. To prevent this phenomenon, the detection only at the foremost peak greater than the critical value is determined and other detection at following peaks greater than the critical value is disregarded. Otherwise, it is possible to modify the detection so that the foremost detection is disregarded and the other detection after the foremost detection is determined.

The appliance of the decision function by arithmetically modifying the decision function is a simple modification of the present invention and belongs within the scope of the technical spirit of the present invention. There will be examples to modify a case where the detecting point of time is determined when the detected value is greater than a predetermined critical value A by setting del3[n]=del2[n]−del2[n−1] as a decision function to the other case where the detecting point of time is determined when the detected value is greater than 0 (zero) by setting del3[n]−A as a decision function, or where the detecting point of time is determined when the detected value is greater than 1 (one) by setting del3[n]/A as a decision function. The more complex modification will be a simple arithmetic modification of the present invention and will belong within the scope of the present invention.

While this invention has been shown and described in connection with the preferred embodiment for illustrating the principle of the present invention, the present invention is not limited to the construction and operation as it is shown and disclosed. Rather, it is to be understood to those skilled in the art that it is possible to do various modifications and variations to the present invention without departing from the spirit and scope of the appended claims. Therefore, those appropriate modifications and variations and equivalents should be considered to be within the scope of the present invention.

INDUSTRIAL APPLICABILITY

According to the relaying method for protecting a transformer according to the present invention, by using functions relating to the rate of change of currents of the primary and secondary coils of the transformer or a differential current, the abnormal current is precisely determined without influence from the remanent magnetic flux and material of the transformer, regardless of whether the abnormal current is reasoned from the inrush or internal fault. Such a constitution is contrary to the conventional art. Therefore, the transformer is rapidly protected and the stability of the power system can be enhanced by precisely detecting the internal fault of the transformer.

What is claimed is:

1. A relaying method for protecting a transformer comprising the steps of: 1) selecting a decision function based on one of a primary current of the transformer, a secondary current of the transformer, and a differential current therebetween: 2) determining a value of the decision function by measuring the primary current and/or the secondary current, and determining whether the value of the decision function is greater than a predetermined critical value at predetermined intervals; 3) memorizing a certain time point as a first detection time when the value of the decision function is initially determined as a value greater than the critical value at a certain time point or after a previous secondary detection time point; 4) determining as an inrush the case where the value of the decision function is detected as a value greater than the critical value at a certain time point before a predetermined time and after the first detection time point; and 5) determining as an internal fault the case where the value of the decision function is not detected as a value greater than the critical value at a certain time point after a predetermined time and the first detection time point, and generating a signal for driving a circuit breaker to protect the transformer.

2. The relaying method as claimed in claim 1, wherein at step 1), the decision function is one of second derivatives or adjusted second derivatives of the primary current, the secondary current, and the differential current, or one of the energy functions of the second derivatives or the adjusted second derivatives of the primary current, the secondary current, and the differential current.

3. The relaying method as claimed in claim 1, wherein at step 1), the decision function is one of third derivatives or adjusted third derivative of the primary current, the secondary current, and the differential current, or one of the energy functions of the third derivatives or the adjusted third derivatives of the primary current, the secondary current, and the differential current.

4. The relaying method as claimed in claim 1, wherein at step 1), the decision function is one of fourth derivatives or adjusted fourth derivative of the primary current, the secondary current, and the differential current, or one of the energy functions of the fourth derivatives or the adjusted fourth derivative of the primary current, the secondary current, and the differential current.

5. The relaying method as claimed in any one of claims 1 through 4, wherein step 2) comprises the sub-step of preventing a malfunction by, when the value of the decision function greater than the critical value are continuously detected, determining only one specific point of time among the values as an effective detecting time and disregarding the other specific points of time.

* * * * *